US008107237B2

(12) United States Patent
Xu

(10) Patent No.: US 8,107,237 B2
(45) Date of Patent: Jan. 31, 2012

(54) ELECTRONIC DEVICE WITH LATCHING ASSEMBLY

(75) Inventor: Bao-Qin Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 190 days.

(21) Appl. No.: 12/749,520

(22) Filed: Mar. 30, 2010

(65) Prior Publication Data

US 2011/0026198 A1 Feb. 3, 2011

(30) Foreign Application Priority Data

Jul. 29, 2009 (CN) .......................... 200910304948.5

(51) Int. Cl.
*G06F 1/16* (2006.01)
(52) U.S. Cl. ................................. 361/679.58
(58) Field of Classification Search ............. 361/679.01, 361/679.58
See application file for complete search history.

(56) References Cited

U.S. PATENT DOCUMENTS

| 5,316,491 | A | * | 5/1994 | Satou et al. | .................... 439/159 |
| 5,497,296 | A | * | 3/1996 | Satou et al. | ............. 361/679.09 |
| 6,122,163 | A | * | 9/2000 | Stone et al. | ............. 361/679.58 |
| 7,740,289 | B2 | * | 6/2010 | Tang | .............................. 292/80 |
| 7,754,982 | B2 | * | 7/2010 | Zhou et al. | .................... 174/542 |
| 7,758,133 | B2 | * | 7/2010 | Chen et al. | ................. 312/223.2 |
| 7,835,150 | B2 | * | 11/2010 | Degner et al. | ............ 361/679.58 |
| 7,916,466 | B2 | * | 3/2011 | Cheng et al. | ................ 361/679.4 |
| 7,997,631 | B2 | * | 8/2011 | Chen | ......................... 292/251.5 |
| 2010/0053857 | A1 | * | 3/2010 | Zhu et al. | ................. 361/679.01 |

* cited by examiner

Primary Examiner — Lisa Lea Edmonds
(74) Attorney, Agent, or Firm — Altis Law Group, Inc.

(57) ABSTRACT

An electronic device includes a first cover, a second cover, and a latching assembly. The first cover includes a first surface and a second surface including a baffle. The latching assembly includes a sliding member mounted on the first surface, a hook member mounted on the second surface and secured to the sliding member, a bracket secured to the hook member, an elastic member resisting the bracket and the baffle, and a latching member protruding from the second cover. The latching member defines a latching hole. The latching member resists the latching block to cause the bracket to move towards the baffle and the elastic member to be contracted. When the bracket moves until the latching block aligns with the latching hole, the elastic member rebounds to push the latching block to be received in the latching hole, thus the second cover is secured to the first cover.

8 Claims, 6 Drawing Sheets

ELECTRONIC DEVICE WITH LATCHING ASSEMBLY

BACKGROUND

1. Technical Field

The present disclosure relates to electronic devices and, particularly, to an electronic device having a latching assembly.

2. Description of Related Art

A latching structure is generally used to engage a battery cover with a housing of a portable electronic device such as a mobile phone. The latching assembly usually includes a pair of hooks formed at one end of the battery cover and a locking pin protruding from the opposite end of the battery cover. Accordingly, a pair of grooves is defined in one end portion of a backside of the housing of the mobile phone, and a locking hole is defined in the opposite end of the backside of the housing. In assembly, the hooks of the battery cover are firstly inserted into the grooves of the housing, respectively. Then, the battery cover is pressed to the housing until the locking pin of the battery cover is inserted into the locking hole of the housing. The latching assembly is simple in structure, and the engagement between the battery cover and the mobile phone is firm. However, during disassembly, great effort is needed to remove the battery cover from the housing, which makes the battery cover susceptible to damage and is inconvenient for a user to replace the battery.

BRIEF DESCRIPTION OF THE DRAWINGS

The components of the drawings are not necessarily drawn to scale, the emphasis instead being placed upon clearly illustrating the principles of an electronic device with a latching assembly. Moreover, in the drawings, like reference numerals designate corresponding parts throughout several views.

DETAILED DESCRIPTION

Figure 1:
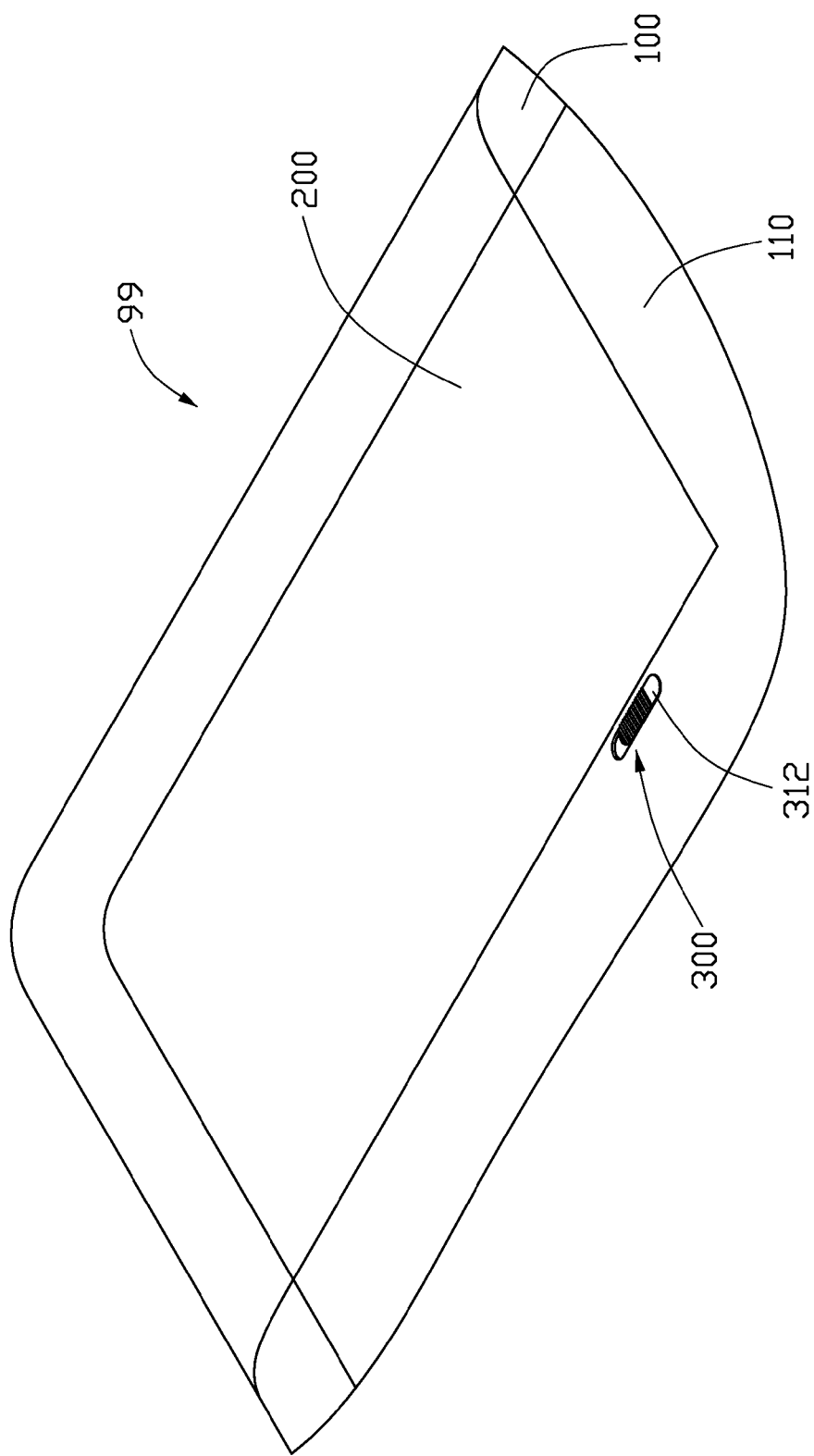
FIG. 1 is a partial, isometric view of an electronic device with a latching assembly in accordance with an exemplary embodiment.
Figure 2:
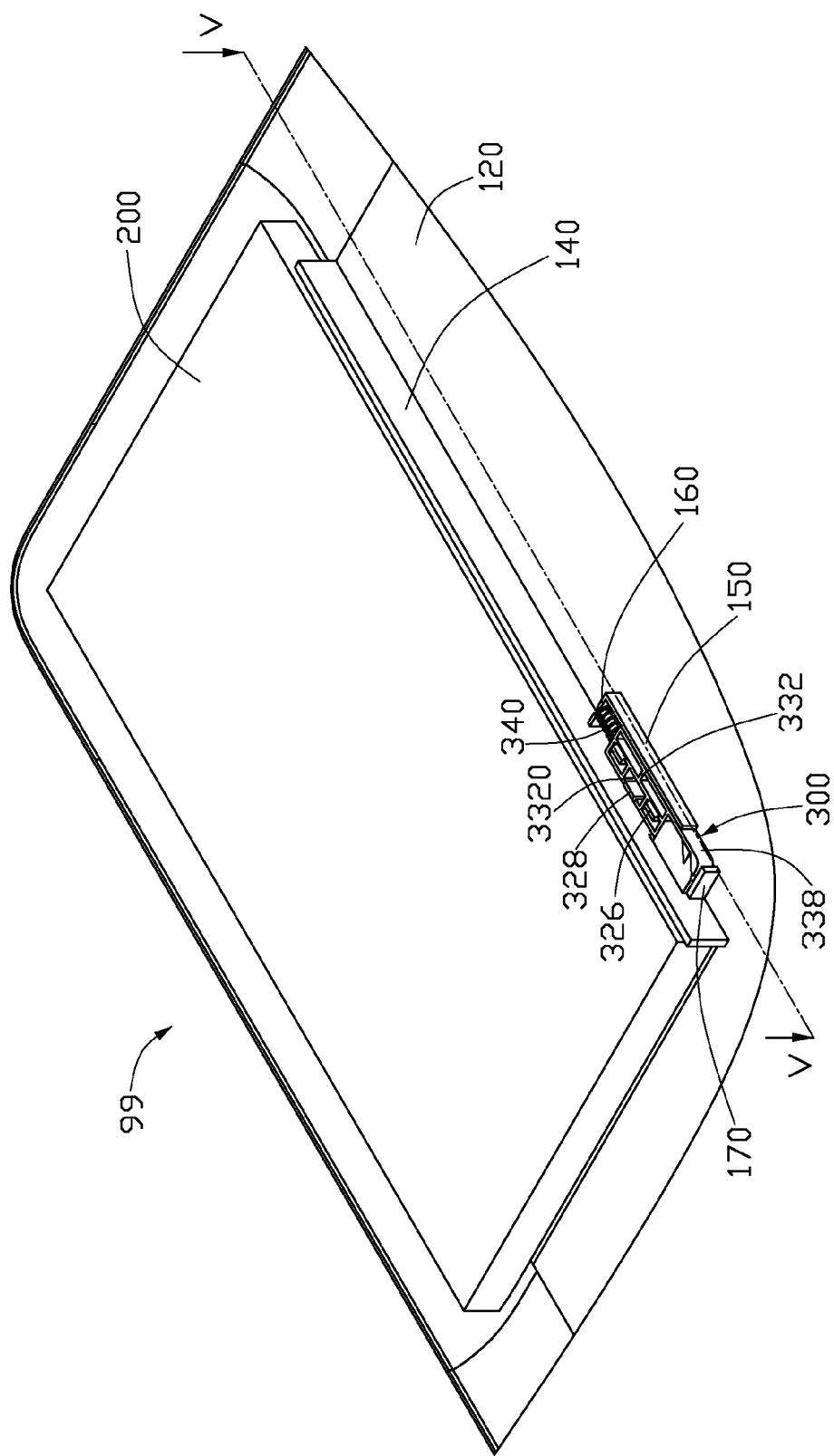
FIG. 2 is a partial, inverted isometric view of the electronic device of FIG. 1, from another viewpoint.
Figure 3:
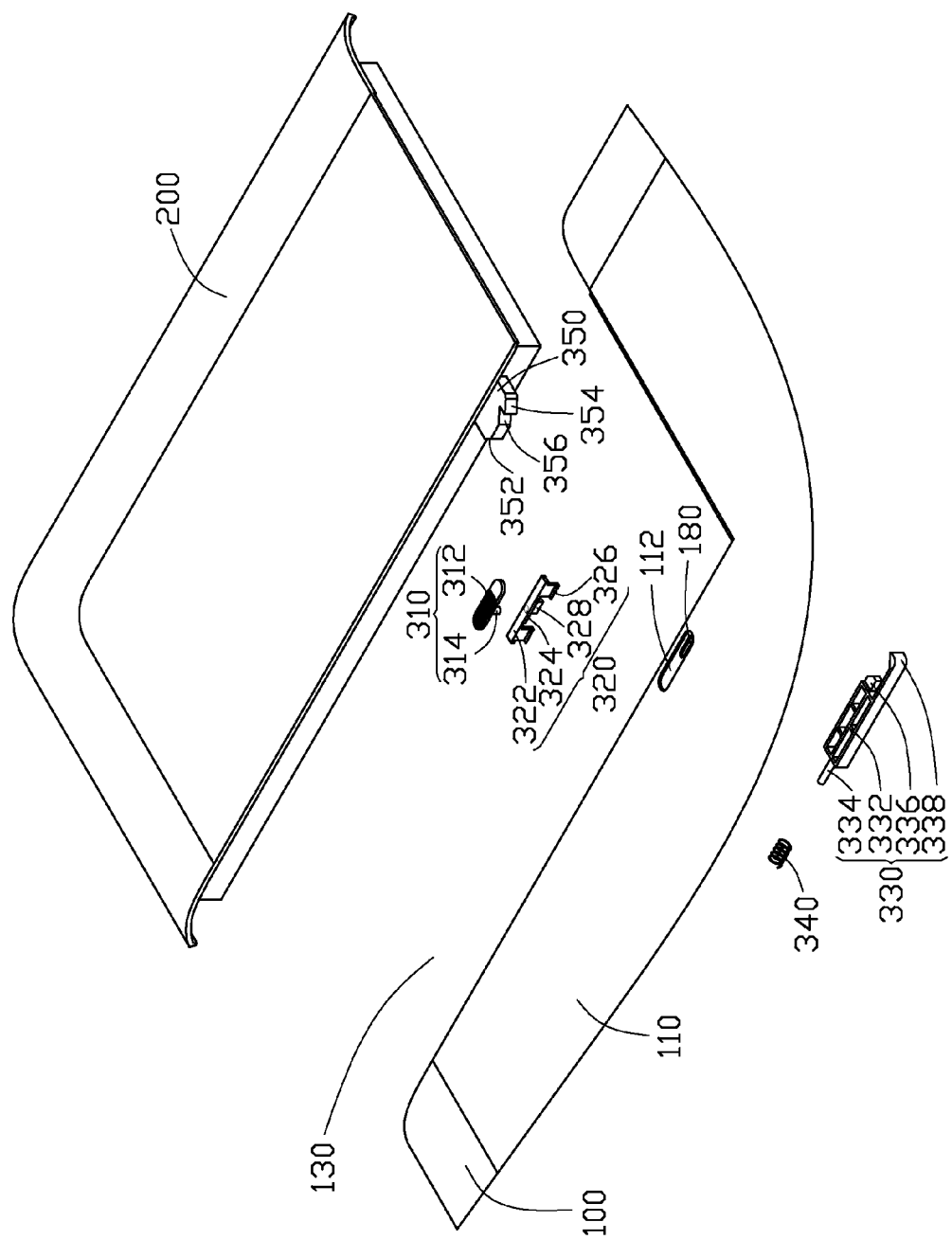
FIG. 3 is an exploded, perspective view of the electronic device of FIG. 1.

Referring to FIGS. 1-3, an electronic device 99 includes a first cover 100, a second cover 200, and a latching assembly 300. The latching assembly 300 is configured for releasably latching the second cover 200 to the first cover 100. The first cover 100 defines an opening 130. The shape of the second cover 200 is adapted to the opening 130. The second cover 200 is latched to the first cover 100 via the opening 130. In the embodiment, the first cover 100 is a bottom cover of the electronic device 99, and the second cover 200 is a battery cover of the electronic device 99.

Figure 4:
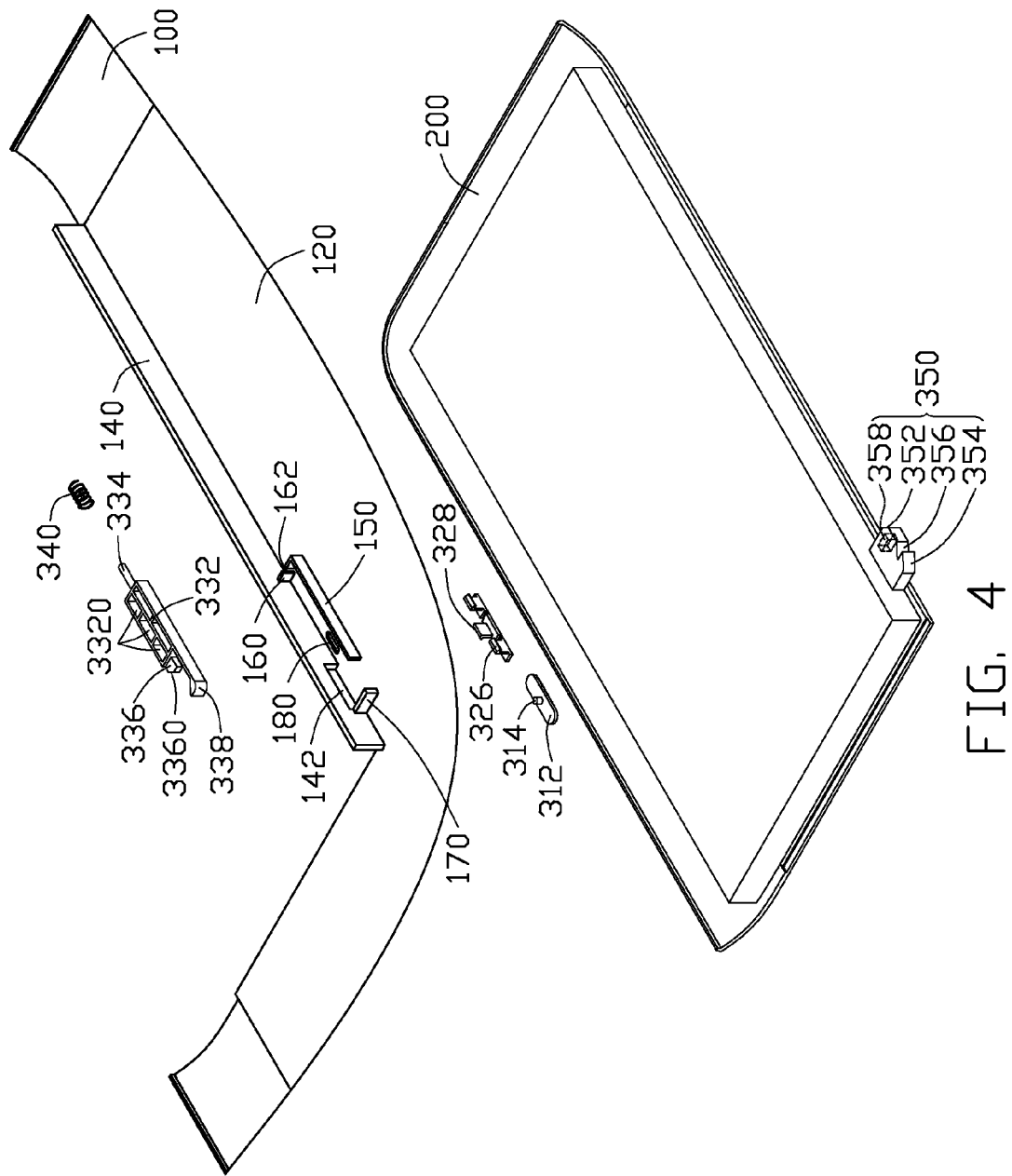
FIG. 4 is an exploded, perspective view of the electronic device of FIG. 2.

Referring also to FIG. 4, the first cover 100 includes a first surface 110 and a second surface 120 opposite to the first surface 110. A recessed portion 112 adjacent to the opening 130 is formed on the first surface 110. The bottom of the recessed portion 112 defines a through hole 180 extending through the first cover 100. A first baffle 140, a second baffle 150, a third baffle 160, and a fourth baffle 170 protrude from the second surface 120 and surround the through hole 180.

The first baffle 140 is adjacent to the opening 130 and defines a first slot 142 extending through the first baffle 140. The second baffle 150 is generally parallel with the first baffle 140. The third baffle 160 is perpendicularly secured to the first baffle 140 and the second baffle 150. The third baffle 160 defines a second slot 162 extending downwards from the top of the third baffle 160. The fourth baffle 170 is generally parallel with the third baffle 160. The fourth baffle 170 is perpendicularly secured to the first baffle 140. The fourth baffle 170 and the second baffle 150 are spaced apart. The first slot 142 is between the third baffle 160 and the fourth baffle 170.

The latching assembly 300 includes a sliding member 310, a hook member 320, a bracket 330, an elastic member 340, and a latching member 350. In the embodiment, the elastic member 340 is a spring.

The sliding member 310 includes an operation portion 312 and a fixing projection 314 protruding from the bottom of the operation portion 312. The height of the fixing projection 314 is greater than the depth of the through hole 180.

The hook member 320 includes a main body 322. The top of the main body 322 defines a fixing hole 324 adapted to the fixing projection 314. A pair of first hook portions 326 and a second hook portion 328 protrude from the bottom of the main body 322. The second hook portion 328 is between the first hook portions 326, and is parallel with the first hook portions 326. The hook of the second hook portion 328 faces one direction and the hooks of each of the first hook portions 326 face an opposite direction.

The bracket 330 includes a frame 332. The frame 332 is generally rectangular. The frame 332 defines three hook holes 3320 extending through the frame 332. The hook holes 3320 are adapted to the first hook portions 326 and the second hook portion 328. A positioning projection 334 protrudes from one sidewall of the frame 332. The elastic member 340 is placed over the positioning projection 334. A latching block 336 and a third hook portion 338 protrude from an opposite sidewall of the frame 332. The latching block 336 includes a first inclined surface 3360 on a side facing the third hook portion 338. The hook of the third hook portion 338 faces the latching block 336.

The latching member 350 protrudes from one sidewall of the second cover 200. The latching member 350 can pass through the first slot 142 of the first baffle 140. The latching member 350 includes a second inclined surface 352 and a third inclined surface 354. The second inclined surface 352 is inclined opposite to the first inclined surface 3360, so that they can match up with and resist each other. A notch 356 is formed on the latching member 350. The notch 356 is adjacent to the third inclined surface 354. The shape of the notch 356 is adapted to the third hook portion 338. The latching member 350 further defines a latching hole 358 adapted to the latching block 336. The latching hole 358 is adjacent to the third inclined surface 354.

The following description is employed for illustrating the procedure of assembling the latching assembly 300. The hook member 320 is placed on the second surface 120 of the first cover 100 to cause the fixing hole 324 to be aligned with the through hole 180. The sliding member 310 is placed in the recessed portion 112 to cause the fixing projection 314 to pass through the through hole 180 and be received in the fixing hole 324, thus causing the sliding member 310 to be secured to the hook member 320. The elastic member 340 is placed over the positioning portion 334. The bracket 330 is placed on the second surface 120 of the first cover 100, causing the positioning portion 334 to be received in the second slot 162, and the first hook portions 326 and the second hook portion 328 to hook the hook holes 3320, respectively. After mounting the bracket 330, one end of the elastic member 340 resists the bracket 330, and an opposite end resists the third baffle 160.

Figure 5:
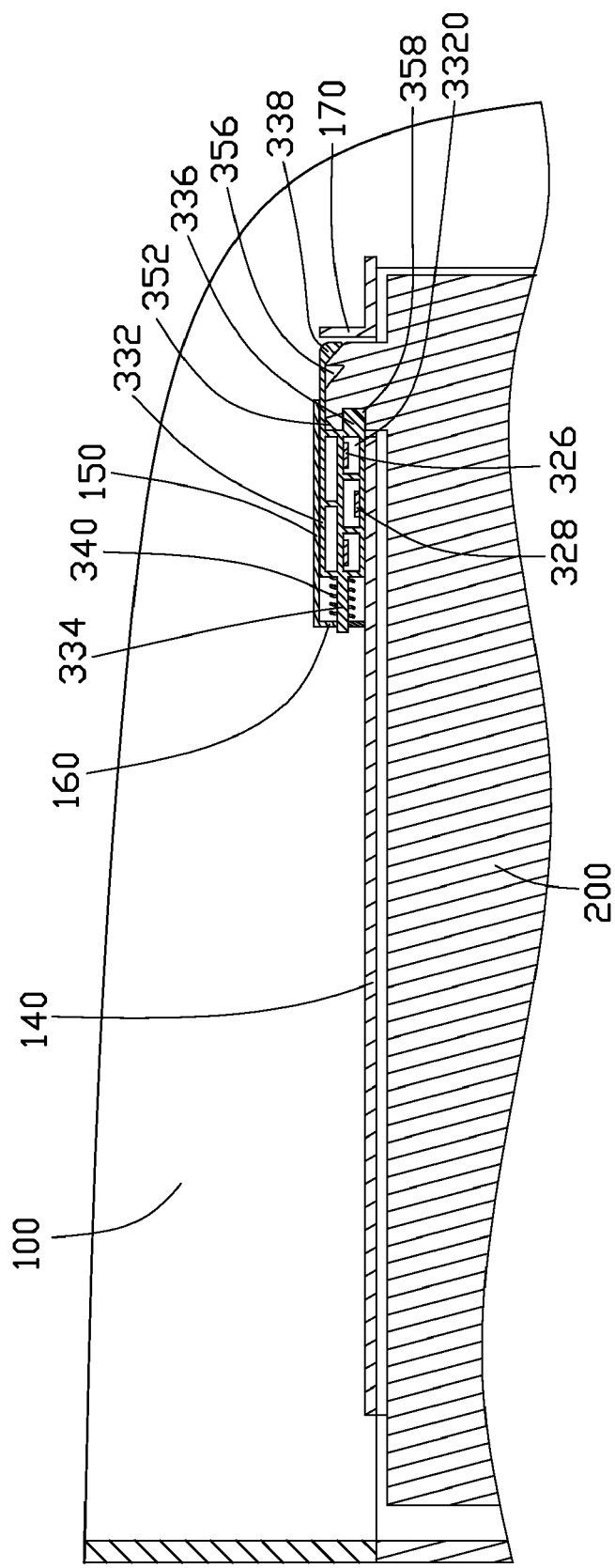
FIG. 5 is a cross-sectional view taken along line V-V of FIG. 2, showing a second cover of the electronic device secured to a first cover of the electronic device.

FIG. 5 is employed for illustrating the procedure of securing the second cover 200 to the first cover 100. After passing the latching member 350 through the first slot 142, the second cover 200 is pushed to cause the second inclined surface 352 to contact with the first inclined surface 3360, and the third inclined surface 354 to contact with the third hook portion 338. The second cover 200 is further pushed to cause the second inclined surface 352 to slide along the first inclined surface 3360, and the third hook portion 338 to slide along the third inclined surface 354. As the second inclined surface 352 slides along the first inclined surface 3360, the latching member 350 resists the latching block 336, causing the bracket 330 to slide towards the third baffle 160. As the bracket 330 slides towards the third baffle 160, the elastic member 340 is contracted. The second cover 200 is further pushed until the latching block 336 is aligned with the latching hole 358. Once the latching block 336 aligns with the latching hole 358, the elastic member 340 rebounds, causing the latching block 336 to be received in the latching hole 358, and the third hook portion 338 to hook the third inclined surface 354. Thus, the second cover 200 is secured to the first cover 100.

Figure 6:
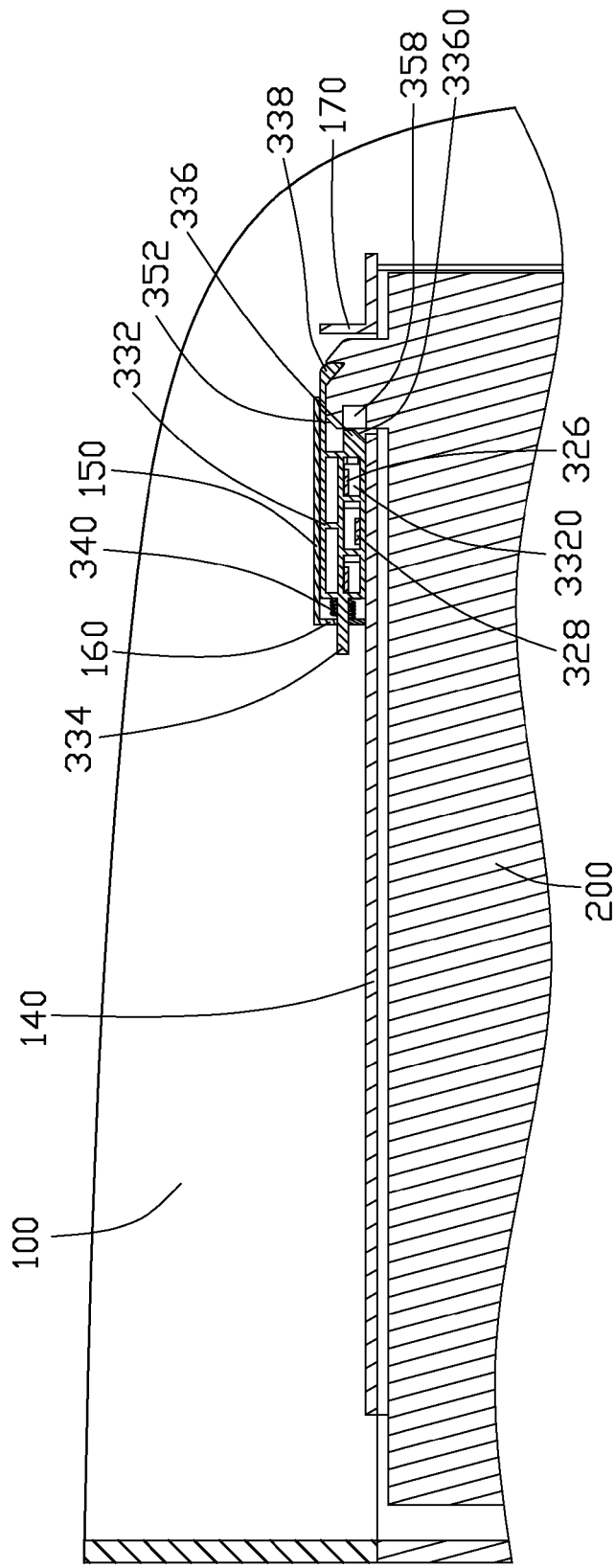
FIG. 6 is another cross-sectional view taken along line V-V of FIG. 2, showing the second cover in place as in FIG. 5 but unlocked.

Referring also to FIG. 6, when removing the second cover 200 from the first cover 100, the operation portion 312 is pushed to slide towards the third baffle 160, causing the hook member 320 and the bracket 330 to slide towards the third baffle 160, and the elastic member 340 to be contracted. The operation portion 312 is further pushed until the latching block 336 moves out of the latching hole 358, and the third hook portion 338 is received in the notch 356. When the third hook portion 338 is received in the notch 356, the latching block 336 and the latching hole 358 are kept apart without exerting external force on the operation portion 312, thus the second cover 200 can be removed from the first cover 100. Once the second cover 200 is removed from the first cover 100, the elastic member 340 rebounds.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device, comprising:
   a first cover comprising a first surface and a second surface opposite to the first surface, wherein a baffle protrudes out from the second surface;
   a second cover; and
   a latching assembly comprising:
   a sliding member moveably mounted on the first surface of the first cover;
   a hook member mounted on the second surface of the first cover and secured to the sliding member;
   a bracket mounted on the second surface of the first cover and secured to the hook member, wherein a latching block protrudes from a first end of the bracket;
   an elastic member, wherein one end of the elastic member resists a second end of the bracket opposite to the first end, and an opposite end of the elastic member resists the baffle; and
   a latching member protruding from one sidewall of the second cover, wherein the latching member defines a latching hole;
   wherein when the second cover is secured to the first cover, the latching member resists the latching block to cause the bracket to move towards the baffle and the elastic member to be contracted, when the bracket moves until the latching block aligns with the latching hole, the elastic member rebounds to push the latching block to be received in the latching hole, thus the second cover is secured to the first cover; when the second cover is to be removed from the first cover, the sliding member is pushed to slide towards the baffle, causing the hook member and the bracket to move towards the baffle until the latching block moves out from the latching hole, thus the second cover can be removed from the first cover.

2. The electronic device as described in claim 1, wherein a hook portion protrudes from the bracket, the hook portion and the latching block are on the same end of the bracket, the latching member defines a notch adapted to the hook portion, when the latching block moves out from the latching hole, the hook portion is received in the notch.

3. The electronic device as described in claim 2, wherein the latching member comprises an inclined surface adjacent to the notch, when the latching block is received in the latching hole, the hook portion hooks the inclined surface.

4. The electronic device as described in claim 1, wherein a positioning portion protrudes from the second end of the bracket, the elastic member is placed over the positioning portion.

5. The electronic device as described in claim 1, wherein the elastic member is a spring.

6. The electronic device as described in claim 1, wherein the bracket defines at least one hook hole, the hook member comprises at least one hook portion, the at least one hook portion hooks the at least one hook hole.

7. The electronic device as described in claim 6, wherein the at least one hook portion comprises a pair of hook portions, the hook of one of the hook portions faces one direction and the hook of the other hook portions faces an opposite direction.

8. The electronic device as described in claim 1, wherein the latching block comprises a first inclined surface, and the latching member comprises a second inclined surface, when the latching member resists the latching block, the second inclined surface resists the first inclined surface and can slide along the first inclined surface.

* * * * *